United States Patent
McDaniel (10) Patent No.: US 10,620,917 B2
(45) Date of Patent: Apr. 14, 2020

(54) PROGRAMMING AUTOMATION IN A 3D GRAPHICAL EDITOR WITH TIGHTLY COUPLED LOGIC AND PHYSICAL SIMULATION

(71) Applicant: Siemens Aktiengesellschaft, Munich (DE)

(72) Inventor: Richard Gary McDaniel, Hightstown, NJ (US)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 15/515,265

(22) PCT Filed: Oct. 2, 2014

(86) PCT No.: PCT/US2014/058769
§ 371 (c)(1),
(2) Date: Mar. 29, 2017

(87) PCT Pub. No.: WO2016/053337
PCT Pub. Date: Apr. 7, 2016

(65) Prior Publication Data
US 2017/0249129 A1    Aug. 31, 2017

(51) Int. Cl.
*G06F 8/34* (2018.01)
*G06F 8/35* (2018.01)
*G05B 19/042* (2006.01)

(52) U.S. Cl.
CPC ........... *G06F 8/34* (2013.01); *G05B 19/0426* (2013.01); *G06F 8/35* (2013.01); *G05B 2219/23291* (2013.01)

(58) Field of Classification Search
None
See application file for complete search history.

(56) References Cited

U.S. PATENT DOCUMENTS 5,812,394 A * 9/1998 Lewis ................ G05B 19/0426
700/17
6,026,336 A * 2/2000 Sakurai .................. G05B 15/02
700/18

(Continued)

FOREIGN PATENT DOCUMENTS

CN    102566447 A    7/2012
CN    102999657 A    3/2013

(Continued)

OTHER PUBLICATIONS

Office Action and Search Report dated Jun. 29, 2018; Application No: 2017114994; Filing Date: Oct. 2, 2014; 17 pages.

(Continued)

*Primary Examiner* — Jae U Jeon
*Assistant Examiner* — Douglas M Slachta (57) ABSTRACT

A system for designing automation applications based on input from a user includes a library interface, a three-dimensional workspace, a simulation engine, and controller code generation unit. The library interface is configured to receive a user selection of a plurality of components from a library of components. The three-dimensional workspace is configured to display the components and create a system design in the three-dimensional workspace using the components based on one or more instructions provided by the user. The simulation engine is configured to generate simulation code based on the system design in the three-dimensional workspace and execute the simulation code in response to a command from the user. One or more of the components in the three-dimensional workspace may be animated during execution of the simulation code. The controller code generation unit is configured to identify one or more physical controllers corresponding to the components in the three-dimensional workspace and generate (Continued)

controller-executable code for those physical controllers based on the system design.

20 Claims, 5 Drawing Sheets

(56) References Cited

U.S. PATENT DOCUMENTS

| | | | | |
|---|---|---|---|---|
| 6,161,051 | A * | 12/2000 | Hafemann | G05B 19/41885 700/17 |
| 6,477,435 | B1 * | 11/2002 | Ryan | G05B 19/0426 700/182 |
| 6,556,950 | B1 * | 4/2003 | Schwenke | G05B 17/02 700/83 |
| 6,944,584 | B1 * | 9/2005 | Tenney | B25J 9/1671 700/17 |
| 7,089,530 | B1 * | 8/2006 | Dardinski | G05B 15/02 700/83 |
| 7,266,476 | B2 * | 9/2007 | Coburn | G05B 17/02 700/83 |
| 7,797,673 | B2 * | 9/2010 | Szpak | G06F 8/34 717/105 |
| 7,865,349 | B2 * | 1/2011 | Kodosky | G05B 17/02 703/17 |
| 8,015,542 | B1 * | 9/2011 | Parthasarathy | G05B 19/0426 717/105 |
| 8,578,347 | B1 * | 11/2013 | Carrick | G06F 11/3409 717/104 |
| 8,707,256 | B2 * | 4/2014 | Plewinski | G05B 17/02 717/108 |
| 9,104,185 | B2 * | 8/2015 | McKelvey | G05B 19/054 |
| 9,720,393 | B2 * | 8/2017 | Cote | G05B 19/41885 |
| 9,904,263 | B2 * | 2/2018 | Blevins | G05B 17/02 |
| 2004/0073404 | A1 * | 4/2004 | Brooks | G05B 19/409 702/183 |
| 2005/0177816 | A1 * | 8/2005 | Kudukoli | G06F 8/34 717/105 |
| 2006/0253792 | A1 * | 11/2006 | Grace | G06F 8/34 715/771 |
| 2006/0253842 | A1 * | 11/2006 | Pees | G06F 11/3632 717/129 |
| 2007/0132779 | A1 | 6/2007 | Gilbert et al. | |
| 2008/0034345 | A1 * | 2/2008 | Curtis | G06F 8/34 717/100 |
| 2009/0063686 | A1 * | 3/2009 | Schmidt | H04L 12/2809 709/227 |
| 2009/0089234 | A1 * | 4/2009 | Sturrock | G05B 17/02 706/45 |
| 2009/0204506 | A1 * | 8/2009 | Yoshida | G06Q 30/06 705/26.1 |
| 2011/0295391 | A1 | 12/2011 | Schneider et al. | |
| 2012/0030646 | A1 * | 2/2012 | Ravindran | G06F 8/34 717/105 |
| 2013/0055196 | A1 * | 2/2013 | Canedo | G06F 8/30 717/104 |
| 2013/0246997 | A1 * | 9/2013 | Liang | G05B 19/0426 717/105 |
| 2015/0095005 | A1 * | 4/2015 | Russell | G06F 17/5018 703/7 |
| 2017/0060726 | A1 * | 3/2017 | Glistvain | G06F 11/3664 |

FOREIGN PATENT DOCUMENTS

| | | |
|---|---|---|
| CN | 103149849 A | 6/2013 |
| EP | 1106332 A2 | 6/2001 |
| JP | H08-272844 A | 10/1996 |
| JP | H10-143221 A | 5/1998 |
| JP | 2004199656 A | 7/2004 |
| JP | 2007-241857 A | 9/2007 |
| JP | 2013-536480 A | 9/2013 |
| RU | 132297 U1 | 9/2013 |

OTHER PUBLICATIONS

JP Office Action dated Mar. 30, 2018, for JP Application 2017-517718, 4 pages.

International Search Report dated Jun. 5, 2015; Application No: PCT/US2014/058769; Filing Date: Oct. 2, 2014; 12 pages.

Office Action and Search Report dated Feb. 7, 2019; JP Application No. 2017517718; Filing Date: Oct. 2, 2014; 8 pages.

Chinese Office Action dated Jan. 2, 2020; Application No. 201480082385.9; Filing Date: Oct. 2, 2014; 11 pages.

* cited by examiner

FIG. 5 the automation behavior. For example, one tool sets up a

PROGRAMMING AUTOMATION IN A 3D GRAPHICAL EDITOR WITH TIGHTLY COUPLED LOGIC AND PHYSICAL SIMULATION

TECHNICAL FIELD

The present invention relates generally to methods, systems, and apparatuses for programming automation systems using a three-dimensional graphical interface which employs tightly coupled logic and physical simulation techniques.

BACKGROUND

In conventional automation software programming environments, programmers use a multitude of separate tools, each with a specific purpose for programming an aspect of the automation behavior. For example, one tool sets up a network protocol, another allocates memory for input and output devices, and yet another is used to encode instructions. These tools are fully separate and must be manually configured; any mismatch between encodings used in one tool will cause other tools or the automation in general to fail. Furthermore, there is little mapping of the language of a given tool with the actual physical hardware used to accomplish the automation. Many of the logical elements defined within an automation tool serve to establish mappings between the constructs of the tools, themselves, and are only indirectly tied to performing any kind of machine behavior.

Some conventional applications claim that although they are commonly used for simulation, they may also produce runtime functions through porting their instructions to a control device. For example, in the field of model-based control, one uses the kinds of equations provided by simulation systems to write control programs. In this situation, there is often no actual simulation of the physical devices. Rather, the programming methods that one would normally use to program a simulation are being used to program a control function. Other systems translate their simulation code to a lower-level language, such as C, so that it can be run in an environment without requiring a special runtime. However, the simulation code is still just being used as a general-purpose programming language rather than simulating the devices and environment in which the automation is being deployed.

Some conventional controllers and data acquisition boards are programmed using non-standard or proprietary languages. These controllers have a wide variety and some will perform a kind of simulation in the sense of being able to control the state of a specified I/O manually during testing. For example, a home automation device may allow the user to program a light to be turned on or off via some kind of web interface. However, such conventional techniques do not go beyond simple switches and manually programmed behaviors to be able to offer physical simulation that is specified, for example, using the properties of the objects being simulated.

SUMMARY

Embodiments of the present invention address and overcome one or more of the above shortcomings and drawbacks, by providing methods, systems, and apparatuses for programming automation in a three-dimensional graphical interface using physical simulation. The technology disclosed herein may be used, for example, to design, simulate, and implement various industrial environments and machinery.

Briefly, various embodiments of present invention describe a graphical simulation environment where logical and physical components reside in the same workspace and can be edited, modified, and executed in an ad hoc manner. For example, in one embodiment, simulation can be run at any point during the design process—even if the design is incomplete or results in failure. Logic may be used to modify the state of components as well as create new components, for example, to represent work items that may interact with other components. The physical simulation of the components may cause work items to be moved, and changed according to the interaction of physical constraints. For example, a conveyor may move a box by providing collision support and imparting forces that push a box forward. Sensors may detect and produce values based on the geometric or other physical properties of simulated objects. Logic may transfer values and initiate or otherwise control activities based on their function. In general, the automation may run in the simulated environment as it would as a physical assemblage. The user may inspect the operation of the simulation as it runs to find errors and otherwise verify the system function. The user may stop the simulation at any time to restore the initial state of the objects and continue editing the automation being designed.

According to some embodiments of the present invention, a system for designing automation applications based on input from a user includes a library interface, a three-dimensional workspace, a simulation engine, and a controller code generation unit. The library interface is configured to receive a user selection of a plurality of components from a library of components. In some embodiments, the library may be populated, in part, based on device models downloaded from a remote marketplace server. The three-dimensional workspace displays the components and creates a system design using the components based on one or more instructions provided by the user. The simulation engine may then generate simulation code based on the system design and execute the simulation code in response to a command from the user. In some embodiments, the simulation code may be executed in a virtual machine environment. In some embodiments, one or more of the components in the three-dimensional workspace is animated during execution of the simulation code. The controller code generation unit included in the aforementioned system is configured to identify physical controllers corresponding to the components in the three-dimensional workspace (e.g., based on a device announce message received from the controllers) and generate controller-executable code for those controllers based on the system design.

According to some embodiments of the aforementioned system, three-dimensional workspace may be configured to perform additional functionality. For example, in some embodiments, the components selected by the user may include physical components associated with a physical device model and logic elements associated with a logical operation. The three-dimensional workspace may then create an association between the logic elements and the physical components based on one or more user instructions. Alternatively (or additionally), the three-dimensional workspace may create a logical element container comprising one or more of the logic elements based on a first user request. An association may then be created between the logical element container and at least one of the physical components based on a second user request. Various techniques may be used for creating this association. For example, in one embodiment, the association is created by identifying a first physical object based on a first user selection; connecting a logic input port object of the logical element container to a device output port object of the first physical object; identifying a second physical object based on a second user selection; and connecting a logic output port object of the logical element container to a device input port object of the second physical object. In some embodiments, the three-dimensional workspace may be further configured to receive a user-configuration of one or more property values for at least one of the physical components. These property values may correspond to, for example, inputs to a physics model used to simulate behavior of one or more of the physical components during execution of the simulation code.

According to another aspect of the present invention, as described by some embodiments, a system for designing automation applications based on input from a user includes a workspace, a simulation engine, and a controller code generation unit. The workspace is configured to allow user creation and manipulation of a three-dimensional model of an industrial environment. The simulation engine is configured to simulate physical behavior of the three-dimensional model. In one embodiment, the simulation engine animates the three-dimensional model during execution of the simulation. The controller code generation unit is configured to generate controller-executable code for one or more physical controllers corresponding to physical components included in the three-dimensional model. In some embodiments, the system also includes a marketplace interface configured to retrieve a new physical device model from a marketplace server. The marketplace interface may then use the new physical device model to create a new physical component for use in the three-dimensional model. In one embodiment, the marketplace interface may also facilitate a user purchase (e.g., via the marketplace server) of a physical device corresponding to the new physical device model.

According to other embodiments of the present invention, a computer-implemented method of designing automation applications based on input from a user includes a computer receiving user selection of a plurality of components from a library of components. The computer creates a system design in a three-dimensional workspace using the components based on one or more instructions provided by the user. Next, the computer generates simulation code based on the system design and executes this code in response to a command from the user. The computer identifies physical controllers corresponding to the plurality of components in the three-dimensional workspace and generates controller-executable code for these physical controllers based on the system design.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there are shown in the drawings embodiments that are presently preferred, it being understood, however, that the invention is not limited to the specific detailed description.

DETAILED DESCRIPTION

The following disclosure describes the present invention according to several embodiments directed at methods, systems, and apparatuses for programming automation in a graphical environment with tightly coupled logic and physical simulation. The various embodiments of the present invention described herein incorporate simulation and control programming together in the same tool such that they are co-mingled and no longer separate practices. The technology described herein is especially applicable, but not limited to, system design and implementation in industrial applications.

Figure 1:
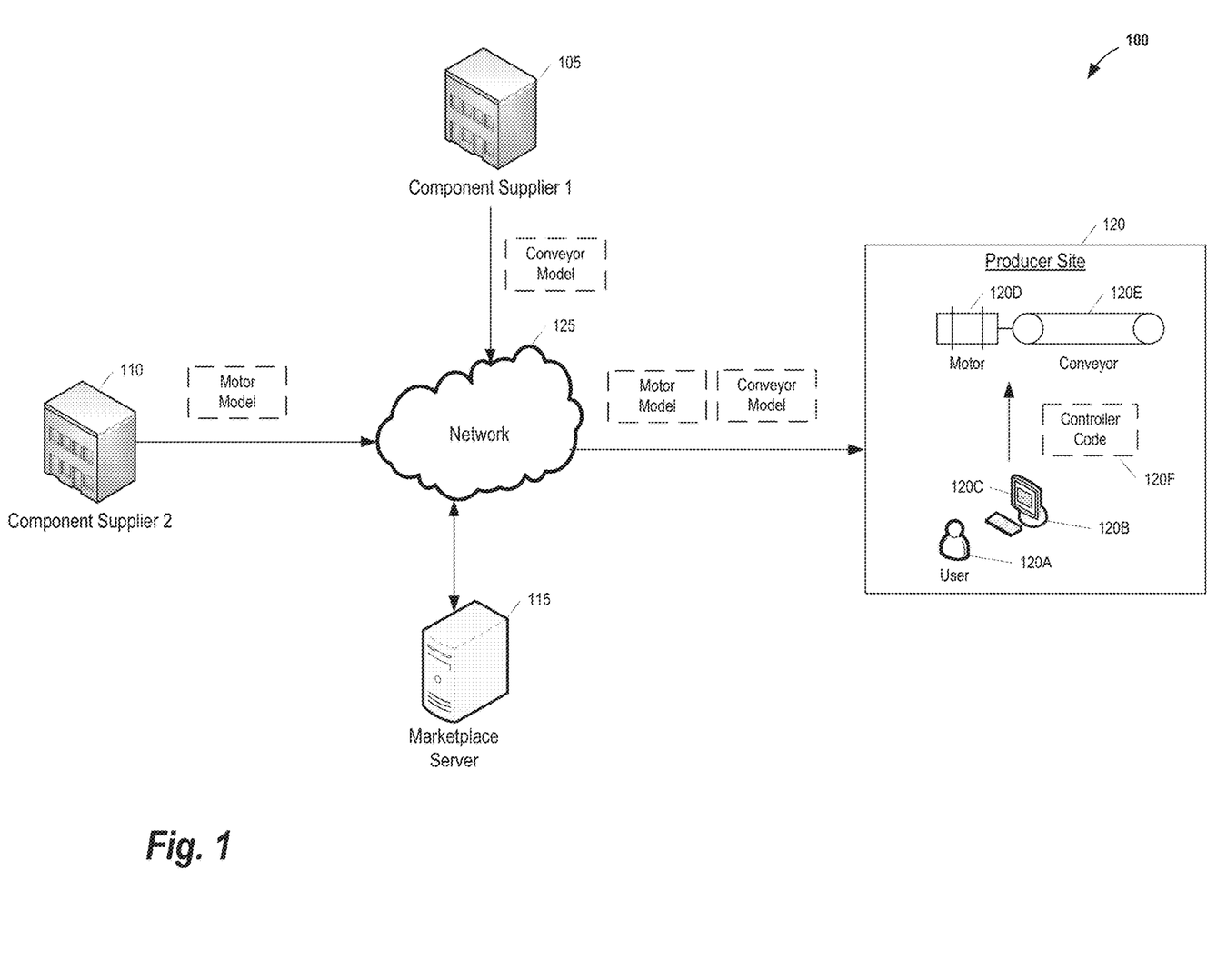
FIG. 1 provides an overview of a system for programming automation, according to some embodiments of the present invention.

FIG. 1 provides an overview of a simulation environment 100 for programming automation, according to some embodiments of the present invention. Briefly, Component Suppliers 105 and 110 supply device models to a Marketplace Server 115 via a Network 125. A User 120A at a Producer Site 120 can then download these models from the Marketplace Server 115 via the Network 125 for use in a simulation environment executed on User Computer 120B. The User Computer 120B allows the User 120A to generate Controller Code 120F which can then be uploaded to controllers associated with physical devices 120D and 120E.

Component Supplier 105 and Component Supplier 110 provide models for a physical conveyor and motor, respectively, to the Marketplace Server 115 via a Network 125. Each model provides detailed information about the device using a standardized language such as Extensible Markup Language (XML). Models may be designed to be functionally self-contained and as intelligent as needed. Models may represent a physical device such as a sensor or actuator, a controlling device such as a programmable logic controller, and may represent functions that can be applied in the application with no physical substance. The contents of the model may include, for example, detailed information about the geometry, kinematics, and behavior of the corresponding physical device. Models may also include indications for interfacing with other models and well as providing different configurations. Computer-aided design software extensions may be used to generate models by incorporating mechanical designs. The Marketplace Server 115 hosts a repository for models generated by component suppliers. The Marketplace Server 115 provides an interface to the repository which allows users to browse and download models. For example, in some embodiments, the Marketplace Server 115 uses a webpage interface which provides a catalog of the various models available for download. The interface may include detailed information regarding each model including, for example, an image of the modeled physical device, a listing of input and output ports, configurable properties, and a description of model behavior. In some embodiments, the Marketplace Server 115 can also handle transactions between users and the various component suppliers. For example, in one embodiment, the user is charged a fee for each model downloaded from the Marketplace Server 115. In another embodiment, the Marketplace Server 115 facilitates a transaction between the user and the component supplier to purchase a physical device corresponding to a particular model.

At the Producer Site 120, the User 120A utilizes User Computer 120B to execute an Engineering Tool 120C (described in greater detail below with respect to FIG. 2) which allows the User 120A to download the motor model and conveyor model to User Computer 120B. The Engineering Tool 120C may then use the downloaded models in a simulation environment which performs computations that mimic the physical activities of the modeled items. Briefly, the Engineering Tool comprises a dynamics simulation that is embedded within a 3D graphical editor and visualization environment. The simulation includes the physical simulation of hardware devices and the work products that the devices manipulate and transform. The physical objects being simulated are representative of actual hardware devices. The simulation for a given device is formulated to match the behavior of that device and to perform the same actions under the same input conditions within the capability of the simulation. The simulation may track the geometric shape, position, kinematic linkages, and dynamics of the objects. The simulation may also include the ability to add and remove objects from the simulation dynamically. This ability can be used to simulate the transformation of objects such as cutting, crushing, and shaping. It may also be used to simulate the introduction and removing of work products from the process.

By simulating an industrial environment, the User 120A can easily identify the necessary physical components and layout needed to enable a particular process. Once the layout has been determined, the Engineering Tool 120C can generate additional details (e.g., a parts list and/or blueprint) so that the necessary physical components can be ordered (if they have not been purchased already) and configured in the desired layout. Additionally, in some embodiments, the Engineering Tool 120C generates controller code that may be used directly on physical components such as programmable logic controllers. For example, in FIG. 1, the Engineering Tool can generate Controller Code 120F that may be utilized directly on the controllers associated with Physical Motor 120D and Physical Conveyor 120E. Thus, installation of the physical devices is streamlined since the Controller Code 120F is ready for use soon after the design is completed.

Figure 2:
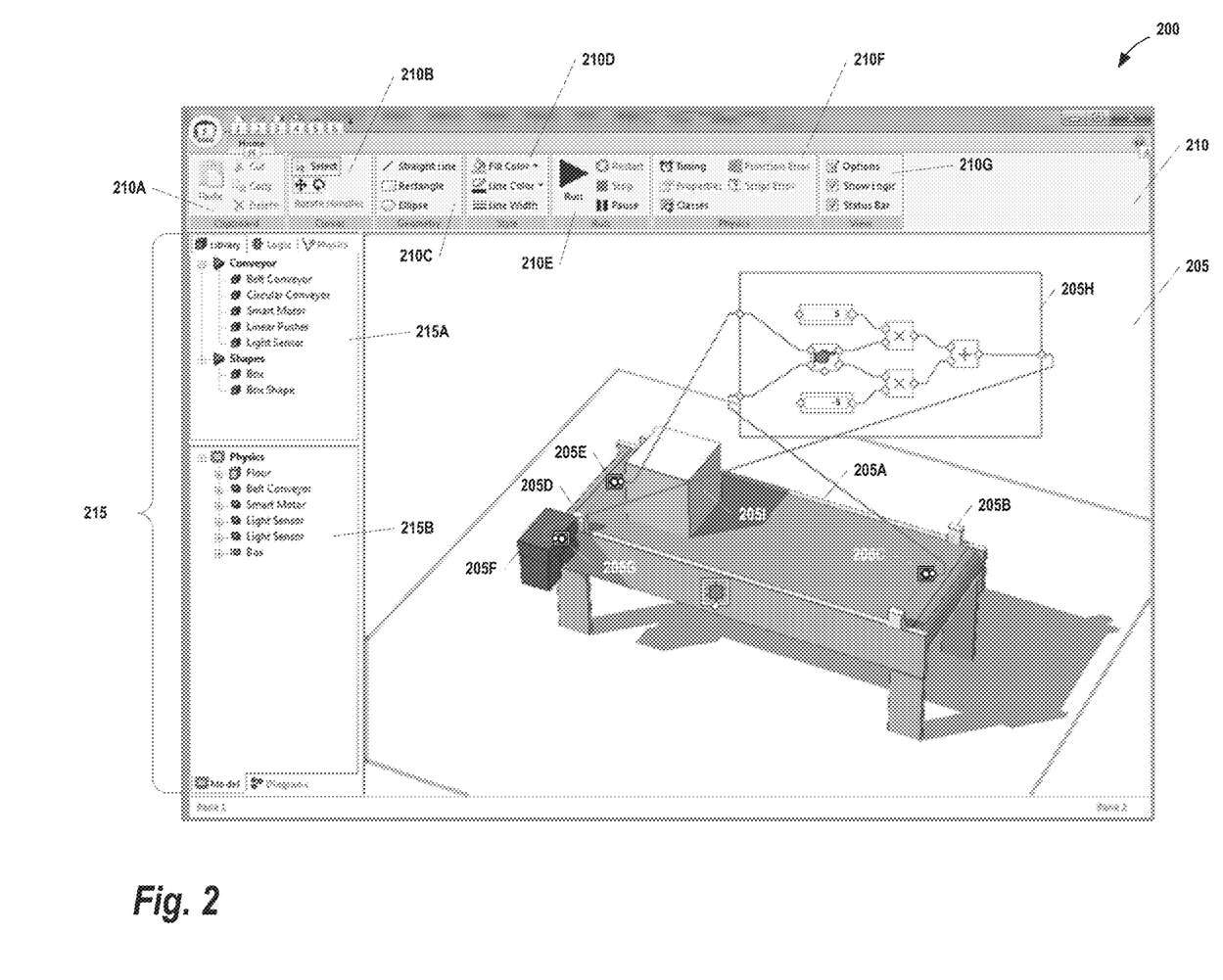
FIG. 2 shows an example of an Engineering Tool, according to some embodiments of the present invention.

FIG. 2 shows an example of an Engineering Tool 200, according to some embodiments of the present invention. Briefly, the Engineering Tool 200 includes a 3D multi-body dynamics simulation that is embedded within a 3D graphical editor and visualization environment. The Engineering Tool 200 includes a 3D Workspace 205, a Toolbar 210, and a Gallery 215 of logical elements that the user can place in the 3D Workspace 205. Note that in FIG. 2, most aspects of the design are visually available in the 3D Workspace 205. Thus, layout, visualization, programming, simulation may be performed in a single interface, with no switching between tools. Moreover, as explained below, 3D components and logic operate together in the same space.

The Engineering Tool 200 offers a potentially low-cost tool designed to run stand-alone for ease of use and efficient editing. Components in the Engineering Tool 200 run as they would in the real world, with behavior animated to show how it works. Components of the physical system may be created from a vendor provided selection, with the graphical complexity is fixed by vendor (i.e., the user does not need to draw anew). The physical system may be "wired" to describe the behavior of components by hooking up input from sensors to logic and on to output devices. Additionally, in some embodiments, the simulation provides instant debugging by providing immediate feedback of internal values and other state. Likewise, the simulation may elucidate problems with the automation by showing cases where the physical interaction is not what is intended. The Engineering Tool 200 provides several benefits to industrial design. Programming directly in the simulated 3D environment reduces levels of indirection that may take place during the design and implementation process. Additionally, a 3D physical simulation allows for quick design verification. This forgiving model of engineering encourages exploration of ideas directly in the test environment.

The Gallery 215 included in the example Engineering Tool 200 shown in FIG. 2 includes a Library Interface Section 215A and a Physics Section 215B. The Library Interface Section 215A includes various components that may be added to the 3D Workspace 205. The user may interact with tabs included at the top of the Library Interface Section 215A to view various physical components and logical components available for use in the 3D Workspace 205. The physics of each component in the 3D Workspace 205 may be viewed and adjusted via the Physics Section 215B.

To develop a design with the Engineering Tool 200, the user drags out a device model from the Gallery 215 and places it in the 3D Workspace 205. Other methods for selecting and positioning the object may alternatively be used. Placing the device model into the 3D Workspace creates a visual component representative of the model. Each component may have connection points where related components or other objects can be attached. In some embodiments, the connected object is automatically aligned and can have its clearance checked with the geometry of the surrounding models. The position in the 3D Workspace 205 is intended to be representative of the devices physical position in the process and should hold analogous geometrical dependencies. For example, if there are two conveyors in the process such that one feeds material by dropping it on the other, then the conveyors should be placed end to end in the simulated space such that the simulated behavior would follow the pattern. FIG. 2 includes a simple example design where a Motor Component 205F operates a Belt Conveyor Component 205A to move a Box Component 205I between two Light Sensor Components 205B and 205D. Activation of the Motor Component 205F causes the Belt Conveyor Component 205A to operate a specified rate.

Each device model may include a port object providing input values and receiving output values from the model. For example, in FIG. 2, the Motor Component 205F includes a Motor Port Object 205G which receives input values. Based on these input values, the Motor Component 205F sets its rate of operation accordingly. The Light Sensor Components 205B and 205D include Light Sensor Port Objects 205C and 205E, respectively. Each Light Sensor Port Objects 205C and 205E produces an output value when its respective light sensor is triggered.

Logical elements are connected to the port objects of the device models to provide functionality to the device models. Logical elements are depicted as blocks with ports where one block can be connected to another. A device model may be linked to a logical block by connecting the port object of the device model with port of the logical element. Similarly, the user may link two blocks by connecting the port of one block to the port of another. In some embodiments, ports can be categorized as input and output types. Input ports connect to output ports where only one link may be connected to a given input port but multiple links may connect to an output port. In other embodiments, ports may be bi-directional, in which case they can be both input and output simultaneously and may be connected arbitrarily. Ports might also be a mixture of different styles and types. In some embodiments, ports can support different values types such as Boolean, integer, arrays of values, and structured values with multiple fields. The connection between ports may be restricted if the types of each port are not compatible. In some embodiments ports can produce values that are references to components or other logical elements such that operations can be performed generically on different kinds of components or perform manipulations on the logic of the application such as disabling or repeating various groups.

Various types of logical elements may be used including, for example and without limitation, arithmetic, selection, signals, memory state, containers, and object affecters. In some embodiments, logic can be overloaded. For example, plus arithmetic may be used for adding floats, integers, and doing logical OR operations on a Boolean value. Logic can affect a simulation object, the behavior of a physical device, or both as well as other logic. As with components generally, logic elements have properties. Changing these properties change the semantics and/or topology of the logical element. Behavior of logic in a logical element container propagates to the simulation object(s) that are connected to the container.

The user may add logic to a system design using the same method as adding devices. The Engineering Tool 200 includes a gallery of logical elements (not shown in FIG. 2) from which the user may select. Logical elements are generally used to represent functions or operations. The user drags the logical element from the gallery and places it into the 3D workspace. Placing logic on a physical component can change the behavior of that component. Logic attached to a component stays with it when the component is moved. Users can use logic to enhance simulation such as generating work products with which the other components can interact. A logical element may be placed into free space or onto a device object or into a logical element container. Logical elements placed into the 3D space and onto 3D device models have a 3D position. The Engineering Tool 200 can use the component to which logical element is attached to perform behaviors particular to that component. Programming and position can be interrelated. The type of the logical element determines its purpose and whether any attached device model will be used as part of its function. Values computed in a logical element are transferred along the link path. When the user rotates and translates or otherwise transforms the workspace view, the logical elements' position will be displayed in the new view position.

Logical Element Container 205H in FIG. 2 provides an example of how a container may be used to contain a group of logical elements. For a logical element that acts on an attached object in the 3D world, an element in a container acts on objects to which the container is attached or onward to its container recursively if the container is placed within a container itself. Links to blocks inside a container from outside may automatically create interface ports on the container and other nested containers as needed. For example, with reference to FIG. 2, Logical Element Container 205H incudes logical elements used to control the Motor Component 205F based on the inputs received from Light Sensor Port Objects 205C and 205E. Specifically, the Logical Element Container 205H adjusts the rate of the Motor Component 205F between −5 and 5 depending on which of the Light Sensor Components 205B, 205D is triggered. In some embodiments, logical element containers may be represented by a two-dimensional field in the Engineering Tool 200. However, in other embodiments, three-dimensional containers may be used. A user can move blocks within a logical element container (or between circuits) to rearrange interface ports as needed. In some embodiments, the space occupied by the local element container in the 3D workspace may be opened and closed to hide the circuit internals when the user is satisfied with the content and wants to reduce clutter. Containers can also be copied as a single unit, thus making the contents of a particular container available to different input and output connections. Note that the original container and the copied container may behave independently. For example, different inputs to different containers can result in different outputs, different states can be stored, and non-deterministic operations can produce different outcomes. The storage of the logic for copied logical element containers can potentially be shared if the user does not wish to modify the content or if the user wants the content to remain linked so that modifications are shared. Logical Element Containers may also be imported from an external device so that complex functions can be packaged and shared between applications. Logical Element Containers may also provide connections that control the state of the container itself. The container may provide an input port that activates and deactivates the behavior of the entire content of the container including nested containers. The container content may not update when the container is deactivated and the output ports of the container may be set to a default state such as zero or false. Other kinds of containers may support different kinds of operations such a grouping logic to be performed in a sequence or act like a finite state automata or to cause a group of logic to be executed repeatedly in a single time cycle.

The Toolbar 210 of the Engineering Tool 200 includes various subsections which enable a user to interact with the model. A Clipboard Subsection 210A includes interface components which allow the user to edit the 3D Workspace 205 by cutting (or copying) a portion of Workspace 205 (e.g., a component) to the user's clipboard. The portion can then be pasted back into the Workspace 205 or into another workspace altogether. A Cursor Subsection 210B in the Toolbar 210 includes interface components which allow a user to select, move, and rotate components in the 3D Workspace 205. Although most components are provided for the user through existing device models, the user may interact with a Geometry Subsection 210C to add various shapes to the 3D Workspace 205. In this way, the user can customize design layouts beyond what is available through using pre-generated device models alone. Similarly, a Style Subsection 210D provides interface components allowing a user to adjust the visual appearance (e.g., color, line width, etc.) of various components placed in the 3D Workspace 205. As described in greater detail below, the Toolbar 210 includes a Run Subsection 210E and a Physics Subsection 210F which provide interface components for creating and interacting with a simulation associated with the components placed in the 3D Workspace 205. Finally, a View Subsection 210G allows the user to select whether particular items in the Engineering Tool 200 should be displayed or not.

The Engineering Tool 200 includes the physical simulation of hardware devices and the work products that the devices manipulate and transform. A Run Subsection 210E in Toolbar 210 allows the user to activate and stop the simulation while the system design is being developed in the 3D Workspace 205. A Physics Subsection 210F in the Toolbar 210 includes interface components which allow the user adjust the timing and other properties of the simulation, as well view any errors generated by the simulation. While the simulation is running, the workspace maintains, calculates, and animates the various components that the user has added to the workspace. For example, physical objects will move and transform based on their dynamic properties, sensing objects will detect their associated targets, behavioral objects will read, write, and calculate values, etc. When the user stops the simulation, the 3D Workspace 205 may be restored to its original configuration so that the user can continue editing. In some embodiments, the user is allowed to edit the system design while the simulation is running In this case, the simulation can be considered running or paused and the user can add, delete, and edit objects at any time. In some embodiments, interaction with the Run Subsection 210E interface allows the simulation to run immediately with no explicit compilation. Moreover, it should be noted that the design in the 3D Workspace 205 is not required to be fully developed and simulation can be run at any time during the design process. In some embodiments, visual cues such as color changes or flashing are used to show where logic is active. The user can inspect logic as it runs and can change values to try out scenarios.

In principle, the simulation generated by the Engineering Tool 200 may have any level of complexity. However, in many embodiments of the present invention, the Engineering Tool 200 is configured such that a user is able to set up and run simulated objects by specifying the higher-level properties of the devices and work products. The simulation may generate virtual work products, track their flow through the various processes carried out by the automation devices, and compute any changes produced in the work products and how those changes would affect the devices. The simulation may also be able to simulate the state and behavior of the automation devices and know what effects they produce on work products. The fidelity of the simulation should be sufficient such that the key functions of the automation are carried out in the virtual world and the programming of the automation can be verified. Other behaviors that can be carried out by the simulation are considered useful so long as those behaviors are realistic and not too difficult to specify. The tolerance and accuracy of the simulation may be adjusted depending on the size, speed, and general needs of the automation. The simulation may be provided to match the domain of the automation. For example, the automation of a robot would likely use simulation that is three-dimensional, kinematic, and may possibly use dynamics. Conversely, the automation of an oil refinery may use one dimensional functions representing pressures, flow, and the topology of the fluid network like pipes and values.

Figure 3:
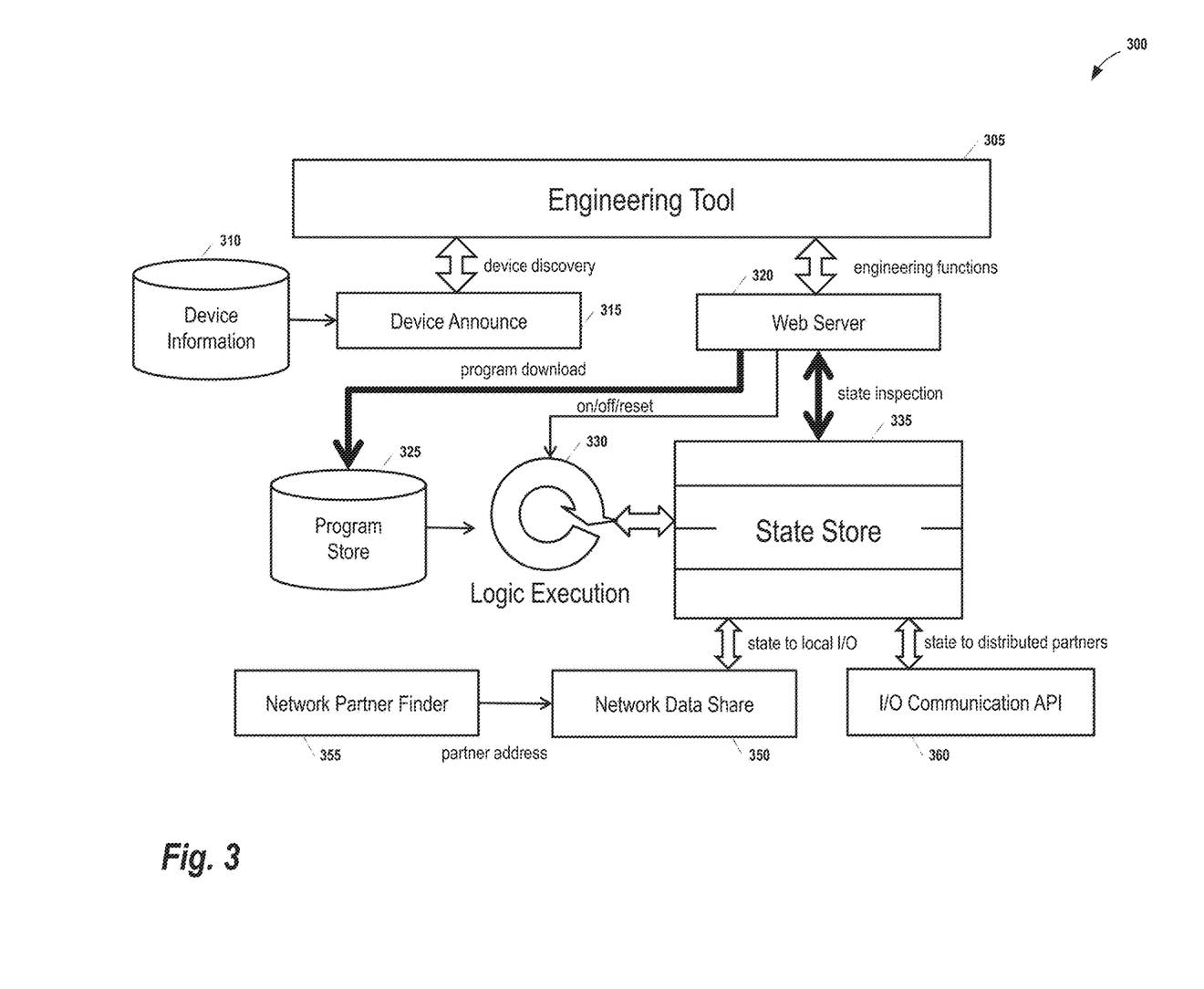
FIG. 3 provides an example controller architecture, according to some embodiments of the present invention.

FIG. 3 provides an example controller architecture 300, according to some embodiments of the present invention. This controller architecture 300 is conceptual and assumes a network connecting the Engineering Tool 305 to one or more connected physical devices. Other kinds of devices such as physical ports or wired connections may also be available. The Engineering Tool 305 sends a generalized request to the network, requesting the identification of any connected devices. The devices respond with Device Information 310 provided via a Device Announce Message 315. Based on the received Device Information 310, the Engineering Tool 305 can create and store virtual connections between the virtual components and the physical devices. In some embodiments, the virtual connections comprise a component identifier and an application identifier. Thus, if there are multiple physical devices in the same application, they can be associated together with the application identifier while being associated with different virtual devices via distinct component identifiers.

Continuing with reference to FIG. 3, once the Engineering Tool 305 has identified the devices and their corresponding virtual connections, it communicates engineering functions to Web Server 320. The engineering functions comprise instructions on implementing logic functionality on particular physical devices. Based on the received engineering functions, the Web Server 320 creates a program and stores it on Program Store 325. In some embodiments, the Engineering Tool 305 is configured to create the program directly rather than having this function performed by the Web Server 320. Under this scenario, the Web Server 320 would simply transfer any program received from the Engineering Tool 305 to the Program Store 325 with or without additional preprocessing of the program code. The program is then executed by the physical controller(s), as is conceptually represented by the Logic Execution Arrow 330. The Engineering Tool 305 and/or the Web Server 320 can communicate with the physical controller(s), to perform functions such as starting, stopping, and resetting the program. Each controller communicates with one or more physical devices using any technique known in the art. For example, in some embodiments, controllers have a direct electrical connection to their corresponding physical devices and communicate using a protocol such as Universal Serial Bus (USB) or Pulse Width Modulation (PWM). In other embodiments, the controllers may communicate with their physical devices over a wired (e.g., Ethernet) or wireless (e.g., IEEE 802.11) communication network.

The State Store 335 is primarily used to transfer shared state between multiple networked controllers but also allows the Engineering Tool 305 to perform a state inspection on program as it is being executed by the controllers. That is, the Engineering Tool 305 can determine the current state of the code running on each controller. In some embodiments, the State Store 335 is shared between different physical controllers via a Network Data Share 350. Additionally, the Network Data Share 350 may be used to share state information other entities such as, for example, a Supervisory Control and Data Acquisition (SCADA) server or a Unified Plant Knowledge Warehouse. The various entities that may receive data are referred to herein as "partners." A Network Partner Finder 355 may be used to find partners requesting or requiring state information. In a distributed control scenario, the partners may be the other controllers on which the logic has been distributed. The Network Partner Finder 355 provides an address for each partner that is found. The State Store 335 may then use these addresses to distribute state information to the partners using an I/O Communication API 360.

Figure 4:
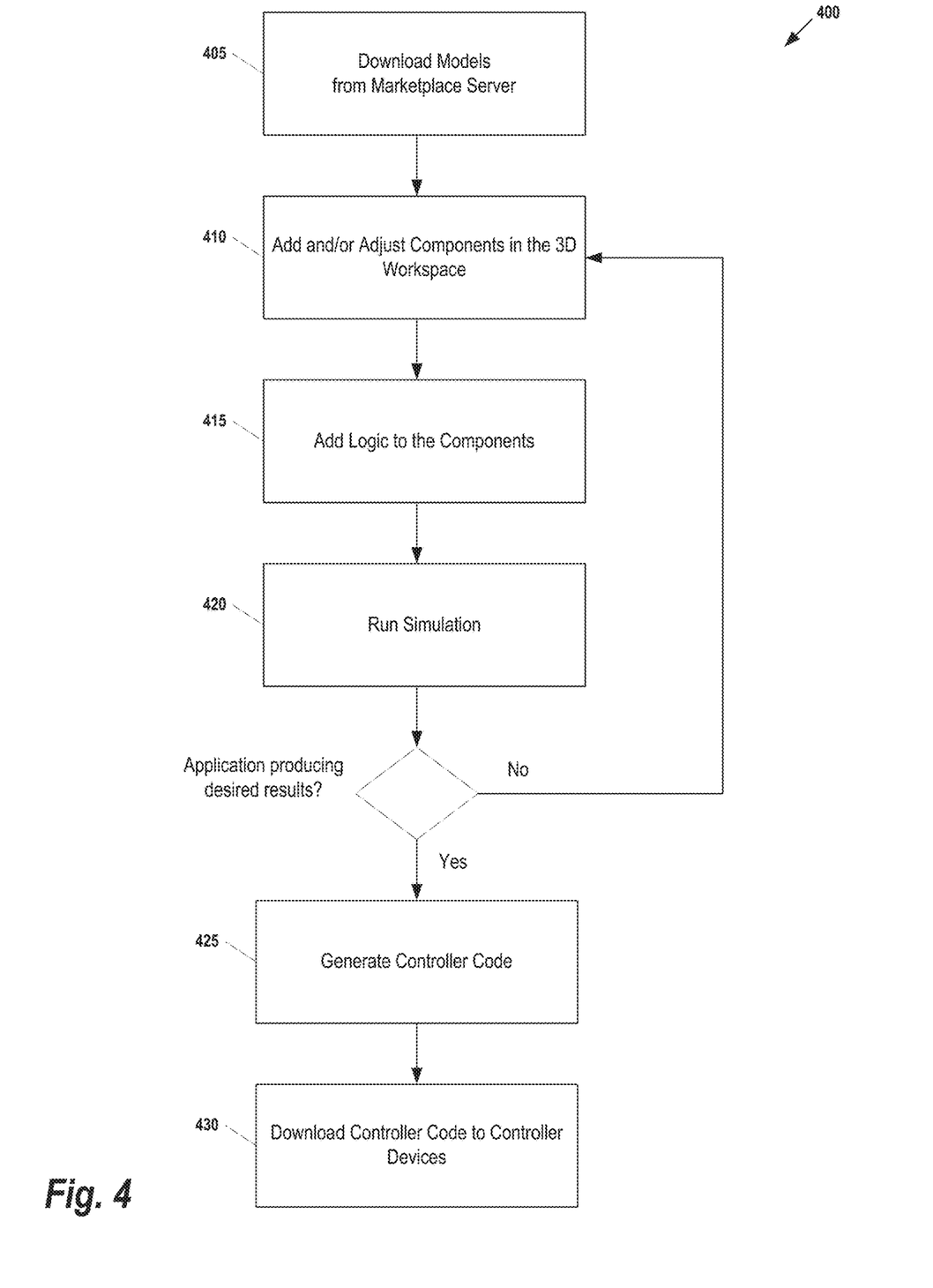
FIG. 4 provides an overview of the process performed at automation runtime in the simulation environment, according to some embodiments of the present invention.

FIG. 4 provides an overview of the process 400 performed in the simulation environment 100, according to some embodiments of the present invention. At 405, the user downloads one or more physical device models from the marketplace server. Each physical device model corresponds to a physical device. For example, a physical device model may include instructions for creating a three-dimensional model of a physical conveyor belt, along with various properties that may be associated with such a device. The information in the physical device model is used to create a physical component for use in the Engineering Tool. In some embodiments, the Engineering Tool performs this creation automatically. For example, in one embodiment, the Engineering Tool includes an interface to the marketplace server. Through user-interaction with this interface, a user can download a physical device model locally and allow the Engineering Tool to create a corresponding physical device model. The creation process may be automatic or it may require the user to explicitly request creation of the model. Additionally, it should be noted that, in some embodiments, physical device models can be downloaded outside of the marketplace server. Thus, for example, users may share physical device models by email for use in their respective Engineering Tools.

Continuing with reference to FIG. 4, at 410, the user creates system design in the three-dimensional workspace by adding and adjusting components in the workspace. In some embodiments, the Engineering Tool provides a library of all available components side-by-side with the workspace, allowing users to select and place components into the workspace through interactions such as click-and-drag (for mouse-based environments) or touch-and-drag (for environments with touch-based displays). Next, at 415, the user adds logical components to the environment. As discussed above, each logical component is associated with a logical operation and users can create containers which include multiple logical components. Once logical components have been added to the workspace, they are used to add logic to physical components by creating associations between the inputs and outputs of the components. For example, as discussed above with reference to FIG. 2, the outputs of a physical device component representing a sensor can be tied to an input of a logical container which, in turn, has its output tied to an input of a physical device component representing a motor. The associations between physical and logical components can be performed similar to the techniques discussed above for adding components to the workspace. For example, an association may be created by clicking (or touching) a component's output and dragging it to another component's input.

At 420, a simulation is run based on the components in the workspace. This simulation simulates the physical and electrical behavior of the components. In some embodiments, one or more of the components may be animated during execution of the simulation. For example, a conveyor belt component may rotate in response to activation of an attached motor component. It should be noted that the simulation may be executed at any point during the design process. Thus, after the simulation is executed, the user determines whether it is providing desirable results. If not, steps 410, 415, 420, may be performed iteratively, allowing the user to add or the physical components and related logic in the workspace. The user can then evaluate the results of each iteration until the desired results are achieved.

Next, at 425, controller code is generated based on system design in the three-dimensional workspace. More specifically, the Engineering Tool identifies physical controllers corresponding to the physical devices and generates code executable by these devices. Various techniques may be used for identifying the controllers. For example, in some embodiments, each controller has a fixed hardware address which is provided to the Engineering Tool by the user. In other embodiments, the Engineering Tool may perform a device discovery process where it processes a device announcement message received from the physical devices to ascertain their respective addresses and other related information. These physical devices may be required to be of the same type as the device models the user selected in the Engineering Tool or, alternatively, the physical devices may only need to be capable of performing a certain set of functions defined by the application. In some embodiments, the Engineering Tool creates and compiles code for each controller based on logic elements and simulation code. In other embodiments, the Engineering Tool includes a virtual machine which executes controller code during execution of the simulation. Thus, the code used in the simulation can be directly used on the controllers, without any additional compilation.

Once the code is generated, at 430, it is downloaded to the physical controllers. In some embodiments, the code may be directly sent by the Engineering Tool to the controllers via a network connection. In other embodiments, the Engineering Tool may be used as an intermediary server or storage medium which communicates with physical controllers.

Figure 5:
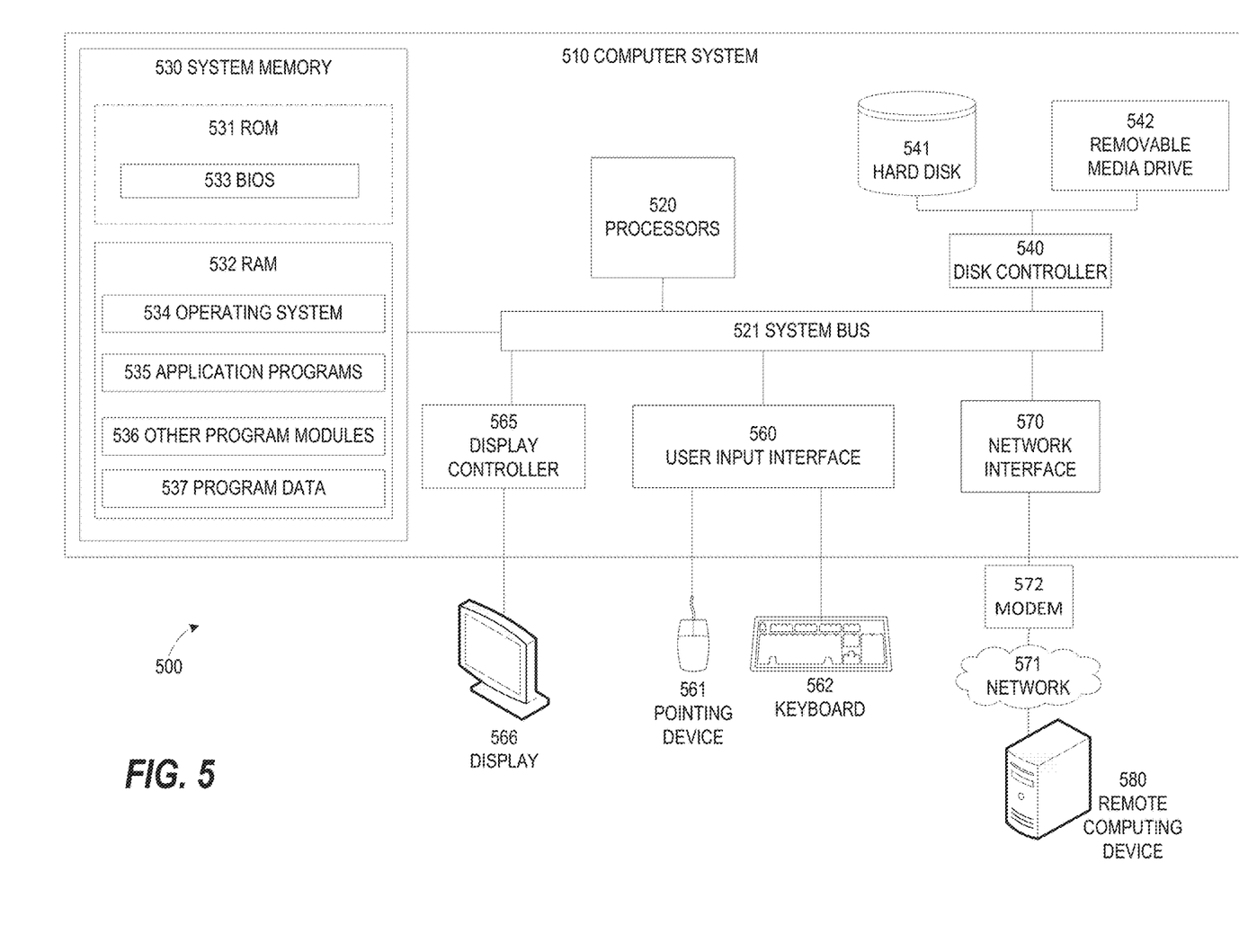
FIG. 5 illustrates an exemplary computing environment within which embodiments of the invention may be implemented.

FIG. 5 illustrates an exemplary computing environment 500 within which embodiments of the invention may be implemented. For example, computing environment 500 may be used to implement one or more components of the simulation environment 100 shown in FIG. 1. Computers and computing environments, such as computer system 510 and computing environment 500, are known to those of skill in the art and thus are described briefly here.

As shown in FIG. 5, the computer system 510 may include a communication mechanism such as a system bus 521 or other communication mechanism for communicating information within the computer system 510. The computer system 510 further includes one or more processors 520 coupled with the system bus 521 for processing the information.

The processors 520 may include one or more central processing units (CPUs), graphical processing units (GPUs), or any other processor known in the art. More generally, a processor as used herein is a device for executing machine-readable instructions stored on a computer readable medium, for performing tasks and may comprise any one or combination of, hardware and firmware. A processor may also comprise memory storing machine-readable instructions executable for performing tasks. A processor acts upon information by manipulating, analyzing, modifying, converting or transmitting information for use by an executable procedure or an information device, and/or by routing the information to an output device. A processor may use or comprise the capabilities of a computer, controller or microprocessor, for example, and be conditioned using executable instructions to perform special purpose functions not performed by a general purpose computer. A processor may be coupled (electrically and/or as comprising executable components) with any other processor enabling interaction and/or communication there-between. A user interface processor or generator is a known element comprising electronic circuitry or software or a combination of both for generating display images or portions thereof. A user interface comprises one or more display images enabling user interaction with a processor or other device.

Continuing with reference to FIG. 5, the computer system 510 also includes a system memory 530 coupled to the system bus 521 for storing information and instructions to be executed by processors 520. The system memory 530 may include computer readable storage media in the form of volatile and/or nonvolatile memory, such as read only memory (ROM) 531 and/or random access memory (RAM) 532. The system memory RAM 532 may include other dynamic storage device(s) (e.g., dynamic RAM, static RAM, and synchronous DRAM). The system memory ROM 531 may include other static storage device(s) (e.g., programmable ROM, erasable PROM, and electrically erasable PROM). In addition, the system memory 530 may be used for storing temporary variables or other intermediate information during the execution of instructions by the processors 520. A basic input/output system 533 (BIOS) containing the basic routines that help to transfer information between elements within computer system 510, such as during start-up, may be stored in system memory ROM 531. System memory RAM 532 may contain data and/or program modules that are immediately accessible to and/or presently being operated on by the processors 520. System memory 530 may additionally include, for example, operating system 534, application programs 535, other program modules 536 and program data 537.

The computer system 510 also includes a disk controller 540 coupled to the system bus 521 to control one or more storage devices for storing information and instructions, such as a magnetic hard disk 541 and a removable media drive 542 (e.g., floppy disk drive, compact disc drive, tape drive, and/or solid state drive). The storage devices may be added to the computer system 510 using an appropriate device interface (e.g., a small computer system interface (SCSI), integrated device electronics (IDE), Universal Serial Bus (USB), or FireWire).

The computer system 510 may also include a display controller 565 coupled to the system bus 521 to control a display 566, such as a cathode ray tube (CRT) or liquid crystal display (LCD), for displaying information to a computer user. The computer system includes an input interface 560 and one or more input devices, such as a keyboard 562 and a pointing device 561, for interacting with a computer user and providing information to the one or more processors 520. The pointing device 561, for example, may be a mouse, a light pen, a trackball, or a pointing stick for communicating direction information and command selections to the one or more processors 520 and for controlling cursor movement on the display 566. The display 566 may provide a touch screen interface which allows input to supplement or replace the communication of direction information and command selections by the pointing device 561.

The computer system 510 may perform a portion or all of the processing steps of embodiments of the invention in response to the one or more processors 520 executing one or more sequences of one or more instructions contained in a memory, such as the system memory 530. Such instructions may be read into the system memory 530 from another computer readable medium, such as a magnetic hard disk 541 or a removable media drive 542. The magnetic hard disk 541 may contain one or more datastores and data files used by embodiments of the present invention. Datastore contents and data files may be encrypted to improve security. The processors 520 may also be employed in a multi-processing arrangement to execute the one or more sequences of instructions contained in system memory 530. In alternative embodiments, hard-wired circuitry may be used in place of or in combination with software instructions. Thus, embodiments are not limited to any specific combination of hardware circuitry and software.

As stated above, the computer system 510 may include at least one computer readable medium or memory for holding instructions programmed according to embodiments of the invention and for containing data structures, tables, records, or other data described herein. The term "computer readable medium" as used herein refers to any medium that participates in providing instructions to the one or more processors 520 for execution. A computer readable medium may take many forms including, but not limited to, non-transitory, non-volatile media, volatile media, and transmission media. Non-limiting examples of non-volatile media include optical disks, solid state drives, magnetic disks, and magneto-optical disks, such as magnetic hard disk 541 or removable media drive 542. Non-limiting examples of volatile media include dynamic memory, such as system memory 530. Non-limiting examples of transmission media include coaxial cables, copper wire, and fiber optics, including the wires that make up the system bus 521. Transmission media may also take the form of acoustic or light waves, such as those generated during radio wave and infrared data communications.

The computing environment 500 may further include the computer system 510 operating in a networked environment using logical connections to one or more remote computers, such as remote computer 580. Remote computer 580 may be a personal computer (laptop or desktop), a mobile device, a server, a router, a network PC, a peer device or other common network node, and typically includes many or all of the elements described above relative to computer system 510. When used in a networking environment, computer system 510 may include modem 572 for establishing communications over a network 571, such as the Internet. Modem 572 may be connected to system bus 521 via user network interface 570, or via another appropriate mechanism.

Network 571 may be any network or system generally known in the art, including the Internet, an intranet, a local area network (LAN), a wide area network (WAN), a metropolitan area network (MAN), a direct connection or series of connections, a cellular telephone network, or any other network or medium capable of facilitating communication between computer system 510 and other computers (e.g., remote computing 580). The network 571 may be wired, wireless or a combination thereof. Wired connections may be implemented using Ethernet, Universal Serial Bus (USB), RJ-6, or any other wired connection generally known in the art. Wireless connections may be implemented using Wi-Fi, WiMAX, and Bluetooth, infrared, cellular networks, satellite or any other wireless connection methodology generally known in the art. Additionally, several networks may work alone or in communication with each other to facilitate communication in the network 571.

An executable application, as used herein, comprises code or machine readable instructions for conditioning the processor to implement predetermined functions, such as those of an operating system, a context data acquisition system or other information processing system, for example, in response to user command or input. An executable procedure is a segment of code or machine readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters.

A graphical user interface (GUI), as used herein, comprises one or more display images, generated by a display processor and enabling user interaction with a processor or other device and associated data acquisition and processing functions. The GUI also includes an executable procedure or executable application. The executable procedure or executable application conditions the display processor to generate signals representing the GUI display images. These signals are supplied to a display device which displays the image for viewing by the user. The processor, under control of an executable procedure or executable application, manipulates the GUI display images in response to signals received from the input devices. In this way, the user may interact with the display image using the input devices, enabling user interaction with the processor or other device.

The functions and process steps herein may be performed automatically, wholly or partially in response to user command. An activity (including a step) performed automatically is performed in response to one or more executable instructions or device operation without user direct initiation of the activity.

The system and processes of the figures are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. As described herein, the various systems, subsystems, agents, managers and processes can be implemented using hardware components, software components, and/or combinations thereof. No claim element herein is to be construed under the provisions of 35 U.S.C. 112, sixth paragraph, unless the element is expressly recited using the phrase "means for."

I claim:

1. A system for designing automation applications based on input from a user, the system comprising:
   a computer-implemented automation system engineering tool comprising:
   a library interface configured to receive a user selection of a plurality of components from a library of components;
   a three-dimensional workspace configured to:
      display the plurality of components, and
      create a system design in the three-dimensional workspace using the plurality of components based on one or more instructions provided by the user;
   a simulation engine configured to:
      generate simulation code based on the system design in the three-dimensional workspace, and
      execute the simulation code in response to a command from the user, wherein at least one of the plurality of components in the three-dimensional workspace is animated during execution of the simulation code;
      automatically create a new component based on the execution of the simulation code and add the new component to the plurality of components in the three-dimensional workspace; and
   a controller code generation unit configured to:
   identify one or more physical controllers corresponding to the plurality of components in the three dimensional workspace, and
   generate controller-executable code for the one or more physical controllers based on the system design prior to the one or more physical controllers being installed in the automation application; and
   installing the generated controller code in the one or more physical controller when the one or more physical controller is installed in the automation application.

2. The system of claim 1, wherein the plurality of components comprises:
   a plurality of physical components, each physical component associated with a physical device model; and
   a plurality of logic elements, each logic element associated with a logical operation.

3. The system of claim 2, wherein the three-dimensional workspace is further configured to:
   create an association between the plurality of logic elements and the plurality of physical components based on one or more user instructions.

4. The system of claim 2, wherein the three-dimensional workspace is further configured to:
   create a logical element container comprising one or more of the plurality of logic elements based on a first user request;
   create an association between the logical element container and at least one of the plurality of physical components based on a second user request.

5. The system of claim 4, wherein the association between the logical element container and at least one of the plurality of physical components is created by:
   identifying a first physical object based on a first user selection;
   connecting a logic input port object of the logical element container to a device output port object of the first physical object;
   identifying a second physical object based on a second user selection; and
   connecting a logic output port object of the logical element container to a device input port object of the second physical object.

6. The system of claim 2, wherein the three-dimensional workspace is further configured to:
   receive a user-configuration of one or more property values for at least one of the plurality of physical components, wherein the one or more property values correspond to inputs to a physics model used to simulate behavior of the at least one of the plurality of physical components during execution of the simulation code.

7. The system of claim 1, wherein execution of the simulation code by the simulation engine includes execution of the controller-executable code in a virtual machine.

8. The system of claim 1, further comprising a marketplace interface component configured to:
   retrieve one or more device models from a marketplace server;
   creating one or more new components in the library of components based on the one or more device models.

9. The system of claim 1, wherein the one or more physical controllers corresponding to the plurality of components in the three-dimensional workspace are identified based on a device announce message received from the one or more physical controllers.

10. A system for designing automation applications based on input from a user, the system comprising:
   an online marketplace comprising physical components available for purchase from a manufacturer and computer executable models of the physical components; and
   a computer implemented engineering tool comprising:
   a workspace configured to allow user creation and manipulation of a three-dimensional model of an industrial automation environment comprising a selected plurality of the components;
   a simulation engine configured to simulate physical behavior of the three-dimensional model and dynamically create a new component in the three-dimensional model based on the simulated physical behavior of the three-dimensional model; and a controller code generation unit configured to generate controller-executable code for one or more physical controllers corresponding to physical components included in the three-dimensional model of the industrial environment prior to the one or more physical controllers being installed in the industrial automation environment, wherein the generated controller executable code is installed in the one or more physical controllers when the one or more physical controllers are installed in the industrial automation system.

11. The system of claim 10, wherein the simulation engine is configured to animate the three-dimensional model of the industrial environment while simulating the physical behavior of the three-dimensional model.

12. The system of claim 10, wherein the three-dimensional model of the industrial environment comprises:
   a plurality of physical components, each physical component corresponding to a physical device model;
   a plurality of logical components, each logical component corresponding to a logical device operator; and
   at least one association between the plurality of physical components and the plurality of logical components.

13. The system of claim 12, wherein the plurality of logical components is grouped in a logical component container displayed in the workspace.

14. The system of claim 12, further comprising a device discovery interface configured to:
   receive a device announcement message from the one or more physical controllers; and
   identify the one or more physical controllers based on the device announcement message.

15. The system of claim 12, further comprising a marketplace interface configured to:
   retrieve a new physical device model from a marketplace server, the new physical device model corresponding to a physical device;
   create a new physical component for use in the three-dimensional model of the industrial environment based on the new physical device model.

16. The system of claim 15, wherein the marketplace interface is further configured to:
   facilitate a user purchase of the physical device via the marketplace server.

17. A computer-implemented method of designing automation applications based on input from a user, the method comprising:
   receiving, by a computer, user selection of a plurality of components from a library of components;
   creating, by the computer, a system design in a three-dimensional workspace using the plurality of components based on one or more instructions provided by the user;
   generating, by the computer, simulation code based on the system design in the three-dimensional workspace;
   executing, by the computer, the simulation code in response to a command from the user, dynamically creating a new component based on the execution of the simulation code, and adding the new component to the plurality of components in the three-dimensional workspace;
   identifying, by the computer, one or more physical controllers corresponding to the plurality of components in the three-dimensional workspace; and
   generating, by the computer, controller-executable code for the one or more physical controllers based on the system design prior to the installation of the one or more physical controllers in an industrial automation system, wherein the generated controller-executable code is installed in the one or more physical controllers when the one or more physical controllers are installed in the industrial automation system.

18. The method of claim 17, wherein executing the simulation code in response to the command from the user comprises executing the controller-executable code in a virtual machine.

19. The method of claim 17, wherein at least one of the plurality of components in the three-dimensional workspace is animated during execution of the simulation code.

20. The method of claim 17, further comprising:
   receiving, by the computer, a device announcement message from the one or more physical controllers; and
   identifying, by the computer, the one or more physical controllers based on the device announcement message.

* * * * *